United States Patent
Latorre et al.

(10) Patent No.: US 11,113,757 B1
(45) Date of Patent: Sep. 7, 2021

(54) SYSTEMS AND METHODS FOR FILTERING DIGITAL CONTENT HAVING A NEGATIVE FINANCIAL INFLUENCE

(71) Applicant: Wells Fargo Bank, N.A., San Francisco, CA (US)

(72) Inventors: Machu Latorre, Alameda, CA (US); Evelyn Ujanen, San Francisco, CA (US); Chris Kalaboukis, San Jose, CA (US); Marria Wairnola Rhodriquez, San Francisco, CA (US); Tleytmas Stephenson, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 357 days.

(21) Appl. No.: 15/431,387

(22) Filed: Feb. 13, 2017

(51) Int. Cl.
G06Q 30/00 (2012.01)
G06Q 40/02 (2012.01)
G06Q 30/02 (2012.01)
G06Q 50/00 (2012.01)
G06F 16/9535 (2019.01)

(52) U.S. Cl.
CPC ......... G06Q 40/02 (2013.01); G06F 16/9535 (2019.01); G06Q 30/0269 (2013.01); G06Q 50/01 (2013.01)

(58) Field of Classification Search
None
See application file for complete search history.

(56) References Cited

U.S. PATENT DOCUMENTS

| | | | |
|---|---|---|---|
| 7,831,494 B2 | 11/2010 | Sloan et al. | |
| 8,812,958 B2 | 8/2014 | Willis et al. | |
| 8,898,698 B2 | 11/2014 | Fleischman et al. | |
| 8,965,967 B2 | 2/2015 | Gilbert et al. | |
| 10,031,915 B2 * | 7/2018 | Appleyard | G06F 16/447 |
| 10,453,079 B2 * | 10/2019 | Bodden | H04W 4/14 |
| 2002/0147671 A1 | 10/2002 | Sloan et al. | |
| 2012/0221952 A1 * | 8/2012 | Chavez | H04N 21/8126 715/733 |
| 2012/0254749 A1 | 10/2012 | Downs et al. | |
| 2013/0166476 A1 | 6/2013 | Samson | |
| 2013/0191194 A1 | 7/2013 | Shreibati et al. | |
| 2013/0198014 A1 | 8/2013 | Walia et al. | |

(Continued)

OTHER PUBLICATIONS

Dusty Porter, How To Create and Manage Facebook Ads—Facebook Tutorial, Dec. 3, 2015, YouTube.com (Year: 2015).*

(Continued)

*Primary Examiner* — Naresh Vig
(74) *Attorney, Agent, or Firm* — Foley & Lardner LLP

(57) ABSTRACT

A computer implemented method for filtering information delivered via a social media service. The method includes receiving social media data from the social media service at a social media computing system and analyzing the received social media data. Analyzing the received social media data comprises categorizing content within the received social media data as one or more of restricted content elements and unrestricted content elements. The restricted content elements and the unrestricted content elements are determined based on one or more predetermined parameters associated with a user profile. The method further including transmitting the unrestricted content elements to a user device.

18 Claims, 5 Drawing Sheets

(56) References Cited

U.S. PATENT DOCUMENTS

| | | | |
|---|---|---|---|
| 2013/0332263 A1* | 12/2013 | Vora | G06Q 50/01 |
| | | | 705/14.44 |
| 2014/0180788 A1* | 6/2014 | George | G06Q 30/0269 |
| | | | 705/14.41 |
| 2014/0282977 A1 | 9/2014 | Madhu et al. | |
| 2014/0310756 A1* | 10/2014 | Canney | H04N 21/26241 |
| | | | 725/86 |
| 2014/0351171 A1 | 11/2014 | Samson | |
| 2015/0081820 A1* | 3/2015 | Codignotto | H04N 1/32374 |
| | | | 709/206 |
| 2015/0170175 A1* | 6/2015 | Zhang | G06Q 30/0204 |
| | | | 705/7.33 |
| 2015/0186947 A1* | 7/2015 | Huang | G06Q 30/0269 |
| | | | 705/14.66 |
| 2017/0098003 A1* | 4/2017 | Pappas | G06Q 50/01 |
| 2017/0118534 A1* | 4/2017 | Feng | H04N 21/4788 |

OTHER PUBLICATIONS

Jeffry Pilcher, Top 100 Banks on Facebook, Apr. 4, 2016, The Financial Brand (Year: 2016).*

Rocco Alberto Baldassarre, 21 Ways to Improve Your Facebook Ads With Ad Targeting, Aug. 12, 2015, Social Media Examiner (Year: 2015).*

* cited by examiner

SYSTEMS AND METHODS FOR FILTERING DIGITAL CONTENT HAVING A NEGATIVE FINANCIAL INFLUENCE

BACKGROUND

Setting financial goals can be a difficult process for many modern consumers. While various forms of advertisements have long tempted consumers to spend money on certain goods and services, the modern marketplace includes many new forms of temptation to a consumer. One primary source of temptation comes via social media. Social media provides more than advertisements to tempt a consumer. Consumers often receive various updates from their connections on social media containing various temptations to the consumer. For example, the consumer may view content associated with one or more friends or contacts on social media eating an expensive dinner, or purchasing various luxury items. These temptations may lead to the consumer feeling a need to purchase items or to spend money on experiences based on what their friends or contacts are doing. Furthermore, in addition to the temptations presented by a consumer's friends or contacts, social media often also contains a number of directed advertisements that are targeted towards to the consumer. These advertisements may be based on a consumer's search history, or even based on a consumer viewing a post or other data provided by their friends and contacts. For example, if a consumer views a friend's social media page where the friend has recently purchased a luxury item, the social media service may present advertisements related to the luxury item to the consumer in an effort to persuade the consumer to purchase a similar luxury item. All of these factors can make it difficult to maintain a financial goal.

SUMMARY

According to one example embodiment, a computer-implemented method for filtering information delivered via a social media service. The method includes receiving social media data from the social media service at a social media computing system and analyzing the received social media data. Analyzing the received social media data includes categorizing content within the received social media data as at least one of restricted content elements and unrestricted content elements. The restricted content elements and the unrestricted content elements are determined based on one or more predetermined parameters associated with one or more goals of a user stored in a user profile. The method also includes transmitting the unrestricted content elements to a user device.

According to another example embodiment, a system for filtering social media data includes a customer financial institution (FI) social media computing system. The customer FI social media computing system is configured to receive social media data from a social media server and analyze the received social media data. Analyzing the received social media data comprises categorizing content within the received social media data into restricted content elements and unrestricted content elements. The restricted content elements and the unrestricted content elements are determined based on one or more predetermined parameters associated with a financial goal of a user. The restricted content elements are determined to contain content having a potential to induce the user to make purchases inconsistent with achieving the financial goal of the user. The customer FI social media computing system is further configured to transmit the unrestricted content elements to a user device.

According to another example embodiment, a computer-implemented method for filtering information delivered via a social media service includes receiving social media data from the social media service at a social media computing system and analyzing the received social media data. Analyzing the social media data includes extracting one or more social media content elements from the social media data and comparing the social media content elements against one or more references in a dictionary, the references associated with negative influences on one or more goals of a user. Analyzing the social media data further includes categorizing the one or more social media content elements as one or more restricted content elements and unrestricted content elements, the restricted content elements and the unrestricted content elements determined based on comparing the social media elements against the one or more references, and determining if the restricted content elements are associated with one or more exceptions. The method further includes transmitting the unrestricted content elements and the restricted content elements associated with the one or more exceptions to a user device. These and other features, together with the organization and manner of operation thereof, will become apparent from the following detailed description when taken in conjunction with the accompanying drawings.

DETAILED DESCRIPTION

Social media has reached into many aspects of common life for a large portion of the population. While social media performs beneficial services, such giving people a place to voice their opinions and concerns, keep up with friends and family, and providing entertainment, it can also be a great source of temptation for many, especially those who are attempting to create and maintain financial goals. These temptations can lead a consumer to purchase goods or services they do not need, or that they cannot afford based on their stated financial goals. While these temptations are not negative per se, they can be detrimental to the budget minded consumer who is struggling to maintain their financial goals. In addition to financial temptations, social media may also provide temptations that are in opposition to other goals of the consumer, such as fitness goals, weight loss goals, etc.

Referring generally to the figures, systems and methods for filtering content having negative influence are shown in various embodiments. According to the various embodiments, a customer FI social media computing system can be configured to receive social media data from one or more social media services. The customer FI social media computing system can extract social media content from the social media data and further analyze the extracted social media content. The analysis of the social media content can determine whether the social media content contains restricted content. Restricted content may be content that is determined to have a negative influence on the customer based on one or more of the goals the customer has provided to the customer FI social media computing system. The customer FI social media computing system is then configured to transmit the unrestricted social media content to the customer, while not transmitting the restricted social media content.

According to various embodiments, as described in further detail below, providing systems and methods for evaluating, processing, and dynamically modifying social media data, can provide an improved interface to a user by tailoring the content presented to them to reduce temptations, such as financial temptations. This can improve the financial situation of many social media users, by helping to reduce their debts and/or overspending habits. Additionally, the reduction of negative influences in other areas may help to increase the heath of a consumer by reducing temptations which may impact their fitness or weigh loss goals. Accordingly, the embodiments described herein solve the technical and internet-centric problem of filtering digital content to reduce temptations provided to a consumer.

Figure 1:
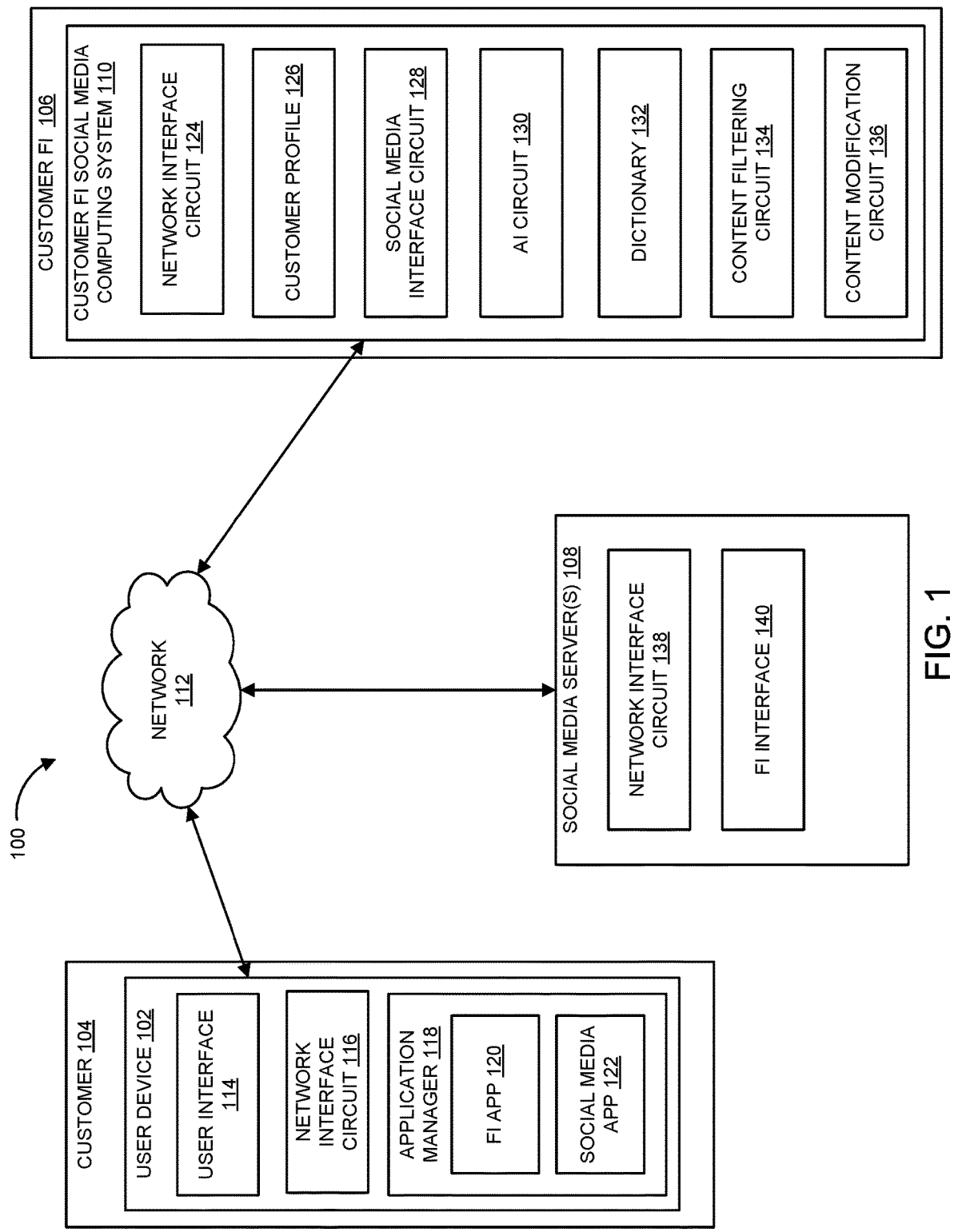
FIG. 1 is a block diagram of a social media content filtering system, according to an example embodiment.

FIG. 1 is a block diagram of a social media content filtering system 100, according to an embodiment. The digital content filtering system 100 may include a user device 102 associated with a customer 104. The customer 104 may be an individual. In one embodiment, the customer 104 is an individual having a social media account. The digital content filtering system 100 may further include a customer FI 106 and one or more social media servers 108. The user device 102, the customer FI 106 and the social media servers 108 may each include a computer system (e.g. one or more servers, each with one or more processing circuits), each including a processor and a memory.

The processors may be implemented as application specific integrated circuits (ASICs), one or more field programmable gate arrays (PFGAs), a group of processing components, or other suitable electronic processing components. The memory may be one or more devices (e.g., RAM, ROM, Flash memory, hard disk storage, etc.) for storing data and/or computer code for completing and/or facilitating the various processes described herein. The memory may be or include non-transient volatile memory, non-volatile memory, and non-transitory computer storage media. The memory may include database components, object code components, script components, or any other type of information structure for supporting the various activities and information structures described herein. The memory may be communicably connected to the processor and include computer code or instructions for executing one or more processes described herein.

The customer FI 106 and the social media servers 108 may include a server-based computing system, for example, comprising one or more networked computer servers that are programmed to perform the operations described herein. For example, the customer FI 106 may include a customer FI social media computing system 110. The customer FI social media computing system 110 and/or the social media servers 108 may be implemented as a distributed computer system, where each function is spread over multiple computer systems.

The customer FI social media computing system 110 and/or the social media servers 108 may be one or more centralized servers connected to one or more of the other listed components within the digital content filtering system 100 via a network 112. In some arrangements, the network 112 may be an internet based network. For example, the components of the digital content filtering system 100 may all be in communication with a cloud-based network, as will be described in more detail below. In some arrangements, the network connections between the components are wired network connections, such as a TCP/IP network. In some arrangements, the network connections may be wireless network, such as Wi-Fi, Wi-Max, cellular (3G, 4G, LTE, CDMA), LoRA, ZigBee, Near Field Communication (NFC), Bluetooth, or any other applicable wireless network protocols. In some arrangements, the customer FI social media computing system 110 and/or the social media servers 108 may be hosted by one or more third-parties.

The user device 102 may be any device associated with the customer 104 that can communicate with the network 112, the customer FI social media computing system 110 and/or the social media servers 108. In some arrangements, the user device 102 may be a user interface on an internet accessible website. In some arrangements, the user device 102 may be a mobile device associated with the customer 104. Example mobile devices can include smartphones (e.g., iPhone®, Android® phones, Windows® phones, etc.), tablet computers (e.g., iPad®, Android® tablet, Microsoft Surface®, etc.), laptop computers, wearable device, or any other device capable of communicating with the network 112 and/or the customer FI 106. In one arrangement, the user device 102 is used to provide access to the customer FI social media computing system 110 and/or the social media servers 108. For example, the user device 102 may communicate directly with the customer FI social media computing system 110 and/or the social media servers 108. In some arrangements, the user device 102 may communicate with the customer FI social media computing system 110 and/or the social media servers 108 via the network 112.

The user device 102 includes a user interface 114, a network interface circuit 116, and an application manager 118. The user interface 114 may be any interface providing inputs to and outputs from the user device 102. For example, the user interface 114 may be a touchscreen display associated with mobile device, such as a smartphone or tablet PC. In other examples, the user interface 114 may be a combination of a display and a separate input device, such as a keyboard. In still further examples, the user interface 114 may be an audio interface, such as a virtual assistant such as Apple's® Siri®, or other virtual assistants. The network interface circuit 116 facilitates data communications to and from the network 112. The network interface circuit 116 may be configured to communicate wirelessly to the network 112, such as via Wi-Fi, Bluetooth®, NFC, ZigBee, IR, RF, cellular (3G, 4G, LTE, CDMA), etc. In some arrangements, the network interface circuit 116 may communicate with the network 112 via a wired connection, such as via Ethernet, a LAN, a WAN, Firewire, USB, or another applicable wired interface. In some embodiments, data passing through the network interface circuit 116 is encrypted.

The application manager 118 is configured to manage one or more software applications (apps) associated with the user device 102. For example, the application manager 118 may manage an FI app 120 and/or one or more social media apps 122. In one arrangement, the application manager 118 processes requests from the network interface circuit 116 to execute one or more applications. For example, the network interface circuit 116 may receive a request to open the FI app 120 to allow for the customer FI 106 to interface with the user device 102. Similarly, the network interface circuit 116 may receive a request to open the FI app 120 to allow for the social media servers 108 to access the social media apps 122.

The FI app 120 may be a mobile banking application, associated with an FI used by the customer 104, such as customer FI 106. In one embodiment, the FI app 120 allows for direct communication between the user device 102 and the customer FI 106. In further examples, the FI app 120 may be a mobile wallet application. In one arrangement, the application manager 118 processes requests from the network interface circuit 116 to execute one or more applications. For example, the network interface circuit 116 may receive a request to open the FI app 120 to allow for the customer FI 106 to interface with the user device 102. The social media app 122 may be an application associated with a social media service. Non-limiting examples of social media services include Facebook®, Instagram®, Twitter®, Foursquare®, Snapchat®, Yelp®, etc. The social media apps 122 may allow the customer 104 to access their account associated with the social media services. The social media apps 122 may further allow the customer 104 to interface with the social media services via the user interface 114. In some embodiments, the FI app 120 and the social media apps 122 may be in communication via an application program interface (API).

As described above, the customer FI social media computing system 110 is associated with the customer FI 106. The customer FI 106 may be a bank, a credit union, a brokerage house, a currency exchange, a governmental institution, or any other FI. The customer 104 may have one or more financial accounts associated with the customer FI 106. For example, the customer 104 may have one or more of a savings account, a checking account, a money market account, a credit card account, or other financial account.

The customer FI social media computing system 110 may process financial transactions requested by the customer 104. In one embodiment, the customer FI social media computing system 110 accesses one or more social media services associated with the customer 104. In one arrangement, the customer FI social media computing system 110 monitors the content associated with one or more social media accounts associated with the customer 104. In another example, the customer FI social media computing system 110 may modify the content of one or more social media accounts associated with the customer 104, as will be described in more detail below.

The customer FI social media computing system 110 may include a network interface circuit 124, a customer profile 126, a social media interface circuit 128, an artificial intelligence (AI) circuit 130, a dictionary 132, a content filtering circuit 134, and a content modification circuit 136. The network interface circuit 124 facilitates data communications to and from the network 112. The network interface circuit 124 may be configured to communicate wirelessly with the network 112, such as via Wi-Fi, Bluetooth, NFC, ZigBee, IR, RF, cellular (3G, 4G, LTE, CDMA), etc. In some arrangements, the network interface circuit 124 may communicate with the network 112 via a wired connection, such as via Ethernet, a LAN, a WAN, Firewire, USB, or another applicable wired interface. In some embodiments, data passing through the network interface circuit 124 is encrypted.

The customer profile 126 may contain a number of characteristics and information associated with the customer 104. For example, the customer profile 126 may include information such as account numbers, account balances, portfolio data, assets, debts, income, etc. In some embodiments, the customer FI 106 may be the primary FI associated with the customer 104. Where the customer FI 106 is the primary FI associated with the customer 104, the customer FI 106 may have access to a majority of the financial transactions performed by the customer 104, which may be stored in the customer profile 126. The customer profile 126 may contain additional information, such as employment, marital status, address, etc. In some arrangements, the customer profile 126 may analyze the customer information to further develop the customer profile 126. For example, the customer profile 126 may categorize the spending habits of the customer 104. For example, the customer profile 126 may include information such as which stores the customer 104 spends the most money at, or how often the customer 104 takes a vacation.

In further arrangements, the customer profile 126 may include information related to one or more financial goals associated with the customer 104. In one arrangement, the financial goals are set by the customer 104. For example, the customer 104 may input one or more financial goals via the FI app 120. However, in other examples the customer 104 may input one or more financial goals via a website associated with the customer FI 106. In still further examples, the customer 104 may work with a personal banker associated with the customer FI 106 to develop financial goals. The personal banker may then enter the financial goals associated with the customer 104 directly into the customer FI social media computing system 110. In some arrangements, the customer FI 106 may establish financial goals for the customer 104. For example, if the customer 104 indicates that they would like to purchase a home in the future, the customer FI 106 may develop one or more goals for the customer 104 to help them achieve their goal. Similarly, the customer 104 may indicate that they want their credit score to increase. The customer FI 106 may then develop goals for the customer 104 to help them achieve their goals. In some examples, the customer FI 106 may determine that the customer 104 could use financial guidance based on their previous banking history and spending habits to automatically generate financial goals for the customer 104. For example, if the customer 104 continuously overdrafts their account, the customer FI 106 may establish a budget for the customer 104 along with financial goals to help them achieve the budget. In one example, the customer FI 106 may establish the budget and financial goals for the customer 104 in exchange for reducing overdraft or other fees.

The customer profile 126 may further include one or more permissions. The permissions may include a level of filtering that the customer FI 106 is allowed to do to help maintain the financial goals of the customer 104. For example, the permissions may include permissions associated with one or more social media accounts associated with the customer 104. The social media account permissions may provide the customer FI 106 access to the one or more social media accounts associated with the customer 104. Additionally, the permissions may include levels of filtering agreed upon by the customer 104. For example, the customer 104 may give the customer FI 106 permission to filter "posts" or "status" information for a given social media account, but prohibit filtering of direct (or personal) messages sent within the social media account. For example, the customer 104 may give the customer FI 106 permissions to filter "posts" or "status" information based on certain terms contained within the social media information. The customer 104 may also set permissions related to filtering information based on geographic locations, establishment, advertisement, or other applicable parameter. As described, the customer 104 may provide these permissions on an individual basis. In some arrangements, the customer FI 106 may provide suggestions as to what should be filtered to help the customer 104 achieve their financial goals. In some arrangements, the more filtering that is permitted, the greater a reward for the customer 104 (e.g. reduction of fees, increase in reward points, etc.). The customer 104 may be able to set the permissions via the FI app 120.

In addition to financial goals, the customer FI 106 may further allow the customer 104 to set other goal types, such as fitness goals, weight loss goals, etc. Similar to setting financial goals, as described above, the customer FI 106 may suggest permissions to be set regarding social media accounts to allow the customer 104 to reach their set goals. For example, if the customer 104 sets a weight loss goal, the customer FI 106 may filter content related to unhealthy foods, such as a post by a friend on social media showing a large steak dinner they are enjoying. As described above, the customer 104 may control the permission levels for all social media accounts in the customer profile 126. The customer 104 may also set one or more exceptions in the customer profile 126. For example, the customer 104 may disallow filtering associated with certain individuals within their social media accounts, such as a mother, a father, or a best friend. In addition to individuals, the customer 104 may set exceptions based on geographic location, establishment, time of day, subject, or any other criteria provided by the customer 104. The exceptions provided by the customer 104 are not filtered by the customer FI social media computing system 110.

The social media interface circuit 128 is configured to interface with the social media servers 108. In one arrangement, the social media interface circuit 128 communicates with the social media servers 108 via the network interface circuit 124. The social media interface circuit 128 may include one or more APIs for communicating with the social media servers 108. The APIs can allow the customer FI social media computing system 110 to communicate directly with the social media servers 108 to both read and write data. The social media interface circuit 128 may utilize multiple APIs for interfacing with multiple social media servers 108. For example, the social media interface circuit 128 may have a first API for communicating with a first social media system such as Facebook®, and a second API for communicating with a second social media server, such as Twitter®. In one arrangement, the social media interface circuit 128 may communicate with the social media servers via a web-browser plug-in installed by the customer 104. The web-browser plug-in may allow the social media interface circuit 128 to receive content from the social media servers directly from the user device 102 of the customer 104, when the customer 104 access the social media services using a web-browser. In one arrangement, the social media interface circuit 128 may receive real time updates from the social media servers 108. In some arrangements, the social media interface circuit 128 may be configured to only receive information from the social media servers 108 when the social media interface circuit 128 specifically requests the information to be provided. The social media interface circuit 128 may be limited to the information that it can read or write to the social media servers 108 based on the permissions provided in the customer profile 126.

The AI circuit 130 is configured to analyze the information received from the social media server 108. In one arrangement, the received information contains social media content. The AI circuit 130 may use one or more algorithms to analyze the social media content to determine the substance of what is contained within the social media content. In one arrangement, the AI circuit 130 is configured to extract the social media content from the information received from the social media server 108. For example, the AI circuit 130 may include a natural language processor for analyzing the textual content within received information to extract social media content. For example, the natural language processor may be able to analyze the social media content to determine if the social media content contains subject matter that should be filtered. The natural language processor allows for keywords to be extracted from the social media content which may be relevant to maintaining the financial goals of the customer 104. Example relevant content may include phrases relating to purchases of luxury items, expensive meals, etc. However, the relevant content may simply relate to simple purchases by individuals within the customer's 104 social media network. Further, the natural language processor may be able to extract certain information from the social media content, such as slang or contextual terms, that would not be relevant where the social media content is analyzed using a simple keyword or key phrase search.

The AI circuit 130 may further include an image processing circuit for analyzing images based social media content. For example, the image processing circuit may analyze photographs or other images contained with social media content received from one or more of the social media servers 108. In one example, the image processing circuit may analyze a photograph from a social media service such as Instagram®. The image processing circuit may determine that the photograph contains subject matter that is detrimental to the goals of the customer 104 and indicate that the image should be filtered. For example, the image may be an image of a friend showing off their new car, or other luxury item. The image processing circuit determines that the image is of a new car, and may indicate that the image should be filtered to reduce a temptation on the customer 104 in regards to their financial goals. Similarly, where the customer 104 has set weight loss goals, the image processing circuit may determine that images containing food, and particularly unhealthy food should be filtered.

The AI circuit 130 may contain other circuits capable of analyzing aspects of the social media content provided by the social media servers 108. For example, the AI circuit 130 may contain audio analysis circuits, facial recognition circuits, location analysis circuits, or other relevant circuits which aid the AI circuit 130 in extracting data from the social media content. Furthermore, the AI circuit 130 may use one or more AI algorithms to process the data within the social media content. Example AI algorithms may include neural networks, genetic algorithms, reinforcement learning algorithms, evolutionary algorithms, swarm intelligence algorithms, or any other applicable AI algorithm.

The dictionary 132 includes a number of references to various terms or other data for use in filtering or modifying social media content. For example, the dictionary 132 may contain a list of terms that are associated with content that should be filtered, (e.g. negative influences). In some arrangements, the terms in the dictionary 132 may be based on data contained within the customer profile 126. For example, the customer profile 126, as described above, may include one or more goals (e.g. financial goals, fitness goals, weight loss goals, etc.) associated with the customer 104. These goals may correspond to certain keywords or key-phrases that are indicated to be contrary to the goals of the customer 104. For example, where the customer 104 sets certain financial goals, certain terms may be associated with temptations to spend additional funds by the customer 104. These terms may be stored in the dictionary 132. The dictionary 132 may include more than simple textual terms, in some arrangements. For example, the dictionary 132 may include a number of geographic locations, establishments, websites, products, or other data points that may be associated with content that should be filtered (e.g. content having a negative influence) and not displayed for viewing by the customer 104. In some arrangements, the dictionary 132 may be a pre-existing dictionary that contains a majority of terms or other data associated with filtering social media content. In some arrangements, the dictionary 132 may be built over time based on the feedback from the customer 104. In some arrangements, the AI circuit 130 may be in communication with the dictionary 132. For example, the AI circuit 130 may compare data extracted from the social media content against known information in the dictionary 132 that is related to maintaining a goal of the customer 104.

The content filtering circuit 134 is configured to filter social media content that is determined to have a negative influence on the goals of the customer 104. In one arrangement, the content filtering circuit 134 can instruct the social media servers 108 to restrict certain social media content from being presented to the customer 104. For example, the content filtering circuit 134 may communicate directly to the social media servers 108 to instruct the social media servers 108 to restrict, or filter, the social media content having a negative influence before the content is provided to the customer 104. The content filtering circuit 134 may instruct the social media servers 108 via one or more APIs, such as those associated with the social media interface circuit 128. In one arrangement, the content filtering circuit 134 may interface directly with the social media servers 108 to block out content determined to have a negative influence on the goals of the customer 104. For example, the content filtering circuit 134 may be able to blur, or black out portions of the social media content having a negative influence on the goals of the customer 104. In other examples, the content filtering circuit 134 can instruct the social media servers 108 to blur, block out, or simply remove social media content determined to have a negative influence on the goals of the customer 104. The content filtering circuit 134 may also be configured to intercept social media content before the content is provided to the customer 104. The content filtering circuit 134 may further be configured to filter content before the content is provided to the customer 104. For example, the content filtering circuit 134 may remove the filtered content from the social media content provided to the customer 104. In one arrangement, the content filtering circuit 134 may directly filter social media content provided to the customer via the social media app 122. For example, the content filtering circuit 134 may be able to communicate directly with the social media app 122. In other arrangements, the content filtering circuit 134 communicates with the FI app 120, which in turn provides an interface to the social media app 122. The content filtering circuit 134 may then instruct the FI app 120 to restrict content determined to have a negative influence by interfacing with the social media app 122.

The content modification circuit 136 is configured to modify certain social media content that may have a negative influence on the customer 104. For example, the content modification circuit 136 may modify advertisements that may be contained within social media content provided to the customer 104. In some arrangements the content filtering circuit 134 may filter out advertisements from the social media content where the content filtering circuit 134 determines that the advertisements have social media content having a negative influence on the customer 104 goals. However, in some arrangements, the social media servers 108 may not allow the customer FI 106 to filter out advertisements presented by one or more social media services. In those instances, the customer FI 106 may be permitted to modify advertisements to achieve a similar goal. For example, if an advertisement is presented which promotes purchasing a certain item, the content modification circuit 136 may be able to modify the advertisement to a different advertisement promoting a product in line with the customer's 104 financial goals, such as a budget managing application, an investing application, or even a public service announcement regarding the importance of saving money. However, the above examples are exemplary only, and other modifications to the applications are contemplated as well. In certain arrangements, the content modification circuit 136 may communicate with the social media servers 108 to instruct the social media servers 108 to modify or use alternate advertisements. For example, the content modification circuit 136 may communicate with the social media servers 108 via one or more APIs, such as those associated with the social media interface circuit 128. In some arrangements, the content modification circuit 136 can modify advertisements prior to the advertisements being presented to the customer 104. In still further arrangements, the content modification circuit 136 may be configured to modify other social media content, such as posts, images, videos, or messages, such as direct messages, personal message, etc.

The social media servers 108, as described above, may be servers associated with one or more social media services. The social media servers 108 may include a network interface circuit 138 and an FI interface 140. The network interface circuit 138 facilitates data communications to and from the network 112. The network interface circuit 138 may be configured to communicate wirelessly to the network 112, such as via Wi-Fi, Bluetooth, NFC, ZigBee, IR, RF, cellular (3G, 4G, LTE, CDMA), etc. In some arrangements, the network interface circuit 138 may communicate with the network 112 via a wired connection, such as via Ethernet, a LAN, a WAN, Firewire, USB, or another applicable wired interface. In some arrangements, data passing through the network interface circuit 138 is encrypted.

The FI interface 140 is configured to interact with the customer FI social media computing system 110. In one arrangement, the FI interface 140 may communicate with the social media interface circuit 128, described above. The FI interface 140 may interface with the customer FI social media computing system 110 using one or more APIs. The FI interface 140 may be configured to receive instructions from the customer FI social media computing system 110 regarding social media content to be filtered or modified, as described above. In other examples, the FI interface 140 may communicate the social media content to be provided to the customer 104 in real-time to allow for the customer FI social media computing system 110 to determine if any of the social media content needs to be filtered or modified. The customer FI social media computing system 110 may then filter and/or modify the social media content before providing the social media content to the customer 104. Alternatively, the customer FI social media computing system 110 may instruct the social media servers 108 to filter and/or modify the social media content, such as via the FI interface 140.

Figure 2:
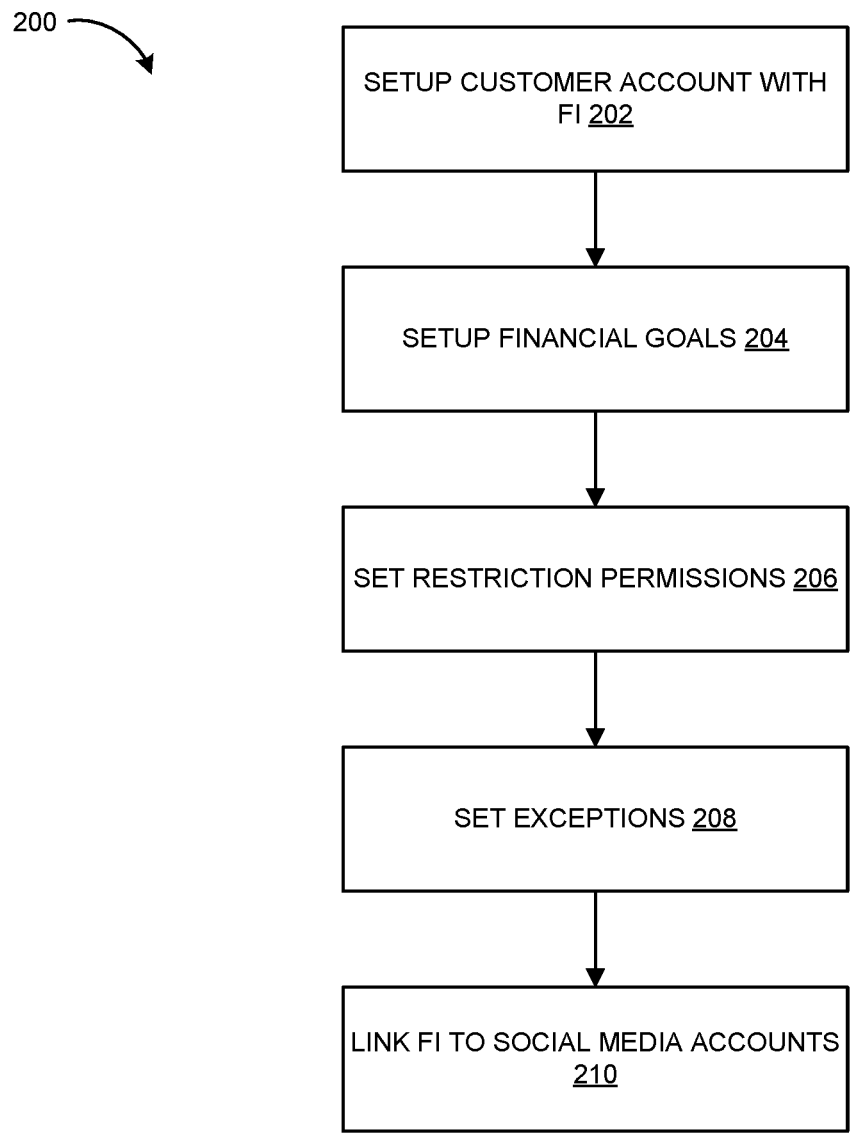
FIG. 2 is a flow chart illustrating a process for establishing filtering parameters, according to an example embodiment.

Turning now to FIG. 2, a flow chart illustrating a process 200 for establishing filtering parameters is shown, according to some arrangements. For clarity and brevity, the method 200 is discussed below in connection with the system described in FIG. 1. The customer 104 sets up a customer account with the customer FI 106 at 202. A customer account may be a checking account, a savings account, a credit card account, or other account associated with the customer FI 106. In some arrangements, the customer 104 may already have an account with the customer FI 106. The customer 104 may then setup one or more financial goals within the customer FI 106 at 204. While the goals described in relation to FIG. 2 are financial goals, as described above it is contemplated that other goal types, such as fitness goals and weight loss goals may also be setup within the customer FI 106. In one arrangement the financial goals may be goals generated by the customer 104. In some arrangements, the goals may be suggested by the customer FI 106. For example, where the customer 104 has had issues managing their finances, the customer FI 106 may provide recommended financial goals for the customer 104 to select. As described above, in some arrangements the customer FI 106 may provide incentives to entice the customer 104 to accept certain financial goals. Example, financial goals may include setting and meeting a monthly budget, setting aside a certain portion of income into savings, paying off a certain percentage of a credit card each month, etc.

Once the goals are set at 204, the customer 104 sets restriction permissions at 206. Restriction permissions are associated with a level of permission given to the customer FI 106 to help the customer 104 maintain their set financial goals. Specifically, the restriction permissions are related to social media content. The restriction permissions establish to what extent the customer FI 106 can filter and/or modify social media content from one or more social media servers 108. For example, a customer 104 may provide permission to filter one social media service (e.g. Facebook®) but disallow the filtering of other social media services (e.g.) Snapchat®). In some arrangements, the restriction permissions may relate to a level of filtering or modification within a given social media service. For example, the customer 104 may allow restrictions based on certain criteria, such as connections to individuals within the social media network, geographic locations, specific content (e.g. food posts allowed, but luxury items and other purchases to be filtered), or other applicable parameter. The restriction permissions may further relate to what type of action can be taken by the customer FI 106. For example, the customer 104 may allow filtering of content, but not modification, or vice versa.

Once the restriction permissions are set, the customer 104 may set exceptions at 208. Exceptions can be associated with certain people within the customer's 104 social media network. For example, the customer 104 may disallow filtering of content for individuals labeled as family. In other examples, the customer 104 may designate specific individuals to be exceptions. However, other exception criteria such as geographic location exceptions, time of day exceptions, certain content exceptions (e.g. normally filter content from person X, unless it is about their child), or other exceptions as requested by the customer 104. After the exceptions have been provided, the customer 104 can link one or more social media accounts to the customer FI 106 at 210. For example, the customer 104 may be required to provide the customer FI 106 with usernames, passwords, and other credentials to allow the customer FI 106 to access the social media accounts associated with the customer 104.

Figure 3:
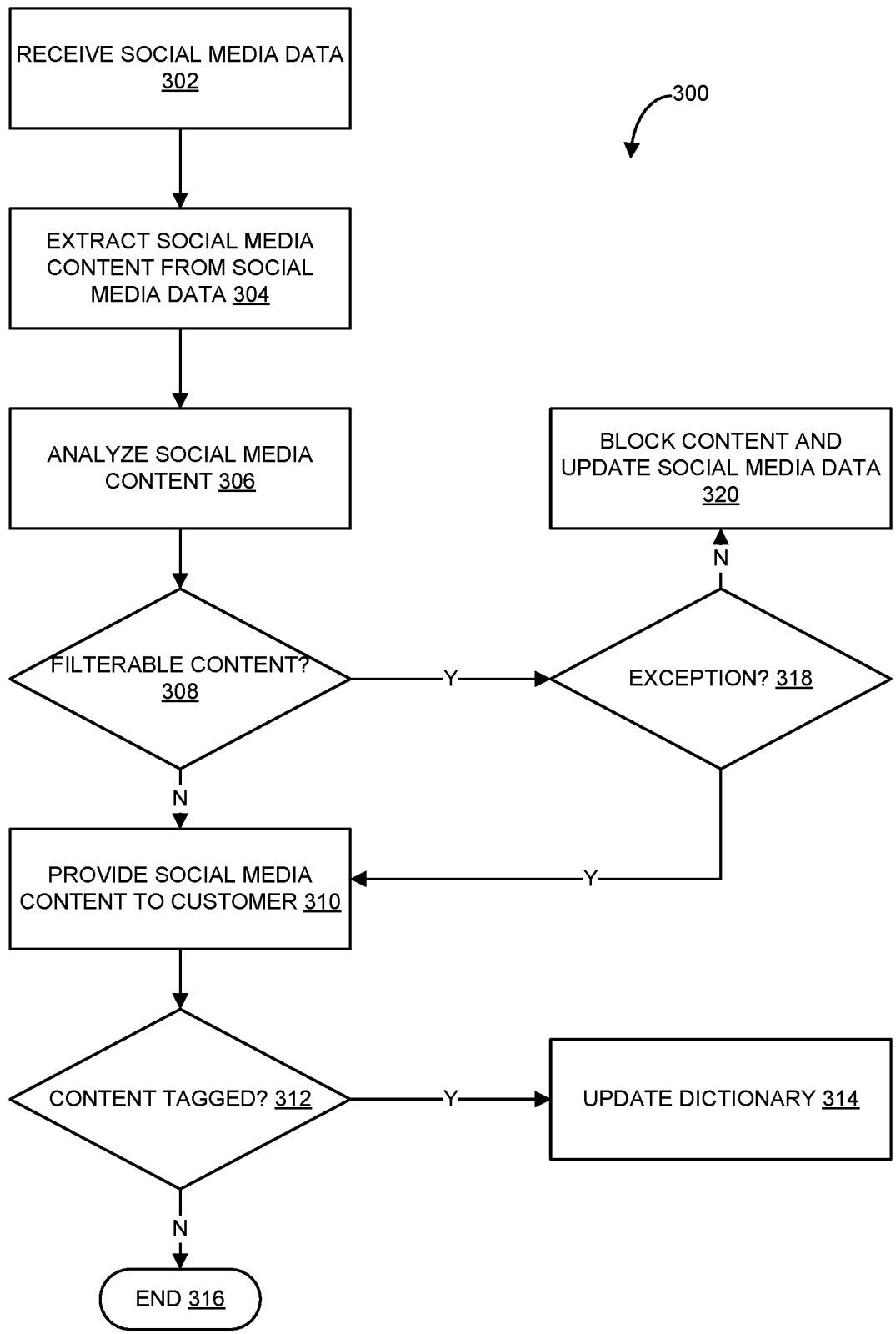
FIG. 3 is a flow diagram of a negative content filtering process, according to an example embodiment.

Turning now to FIG. 3, a flow chart illustrating a negative content filtering process 300 is shown, according to some arrangements. For clarity and brevity, the method 300 is discussed below in connection with the system described in FIG. 1. The customer FI social media computing system 110 receives social media data from one or more social media servers 108 at 302. In one arrangement, the social media data may be received when the customer 104 initiates a request to update their social media feed. For example, the customer 104 may be attempting to update their social media feed to show recent updates within their social network. In some arrangements, the received social media data may be a pushed from one or more of the social media servers 108 indicating that social media data associated with the customer 104 has been updated. In some arrangements, the customer FI social media computing system 110 may be configured to receive social media data associated with the customer 104 from the social media servers 108 via a real-time data stream.

Once the social media data has been received by the customer FI social media computing system 110, social media content is extracted from the social media data. Social media content may include one or more social media content elements which make up a particular aspect of a social network feed. For example, a "post" on Facebook® by a single user is a form of social media content. The social media content may be text, images, audio, video, or metadata, such as a location (e.g. GPS coordinates, location "check-in," etc.). In one arrangement, the AI circuit 130 extracts the social media content from the received social media data, as described above. For example, the AI circuit 130 may be able to extract terms and phrases from the social media data using tools such as a natural language processor. Similarly, the AI circuit 130 may extract social media content from audio social media data also using the natural language processor. The AI circuit 130 may further extract data from image data using an imaging processing algorithm. As described above, the AI circuit 130 may use one or more AI algorithms to extract social media content from the social media data.

Once the social media content is extracted, the social media content is then analyzed at 306. In one arrangement, analyzing the social media content includes comparing the social media content against one or more references that relate to negative influences based on the customer's established goals. For example, the social media content may be compared against one or more references stored in the dictionary 132. As described above, the dictionary 132 may include multiple references that are associated with content having a negative influence on one or more goals established by the customer 104. In one arrangement, analyzing the social media content includes categorizing the received social media content into restricted social media content and unrestricted social media content. Restricted social media content is social media content that is determined to have a negative influence on one or more established goals of the customer 104. In some arrangements, the customer 104 sets permissions for filtering or modifying certain social media content. Accordingly, when categorizing the social media content into restricted social media content and unrestricted social media content, the customer FI social media computing system 110 may first determine if sufficient permissions are implemented to categorize the social media content as restricted social media content. In some arrangements, the categorizations of social media content into restricted social media content and unrestricted social media content is based solely on the social media content itself.

The customer FI social media computing system 110 then determines if the social media content should be filtered before being provided to the customer 104 at 308. In one arrangement, the determination on whether or not to filter the content is based on whether the social media content is restricted social media content or unrestricted social media content. For example, restricted social media content is determined to be required to be filtered, and unrestricted social media content is determined to be passed to the customer 104 without being filtered. In some arrangements, in addition to determining if the social media content should be filtered based on whether the social media content is restricted social media content or unrestricted social media content, the customer FI social media computing system 110 may also determine if the customer 104 has provided sufficient permission to filter certain social media content determined to be unrestricted social media content. For example, the restricted social media content may be associated with a social media service that the customer 104 has not provided permission to filter. In one arrangement, the content filtering circuit 134 determines if the social media content should be filtered.

If the customer FI social media computing system 110 determines that the social media content should not be filtered, the social media content is provided to the customer 104 at 310. In one arrangement, the customer FI social media computing system 110 may instruct the social media servers 108 that the social media content may be provided to the customer 104. In some arrangements, the customer FI social media computing system 110 may provide the social media content to the customer 104 directly. For example, the customer FI social media computing system 110 may regulate the social media content via an API that allows the customer FI social media computing system 110 to control what is transmitted to the customer 104 from the social media servers 108. In some arrangements, the social media servers 108 may transmit social media data to the customer FI social media computing system 110 via an API, and the customer FI social media computing system 110 may then transmit the social media content to the customer 104. In one arrangement, the social media interface circuit 128 may control what content is transmitted to the customer 104.

After the social media content has been provided to the customer 104, the customer FI social media computing system 110 determines if the social media content provided to the customer 104 was tagged to indicate that the social media content contained negative influence content at 312. For example, the customer 104 may be able to select an option via the user device 102 to indicate that a particular portion of the received social media content contained negative influence content. If the social media content is tagged as containing negative influence, the dictionary 132 is updated at 314. For example, the customer FI social media computing system 110 may extract all relevant terms or other content from the social media content using the AI circuit 130, and update the dictionary 132 with the extracted content. In some arrangements, the customer 104 may be able to define exactly what portion of the social media content contained negative influence content, such as via the FI app 120 or the social media app 122. If the social media content is not tagged, the process ends at 316.

If the customer FI social media computing system 110 determines that the social media content should be filtered at 308 (e.g. if the social media content is restricted social media content), the customer FI social media computing system 110 then determines if the restricted social media content is related to an exception, at 318. For example, the customer 104 may have set several exceptions relating to certain social media content, such as making exceptions for certain persons, groups of persons, locations, etc. In one arrangement, the exceptions are stored in the customer profile 126. If the restricted social media content is associated with an exception, the social media content is provided to the customer 104 at 310. If the restricted social media content is not associated with an exception, the restricted social media content is filtered, and the customer's social media feed is updated at 320. In one arrangement, the filtering is performed by the content filtering circuit 134. In some examples, the customer 104 may receive an indication that certain social media content was filtered. For example, the indication may be provided by the social media app 122 and/or the FI app 120. In some arrangements, the customer's social media feed is updated with unrestricted social media content, while the non-exceptioned restricted social media content is filtered.

Figure 4:
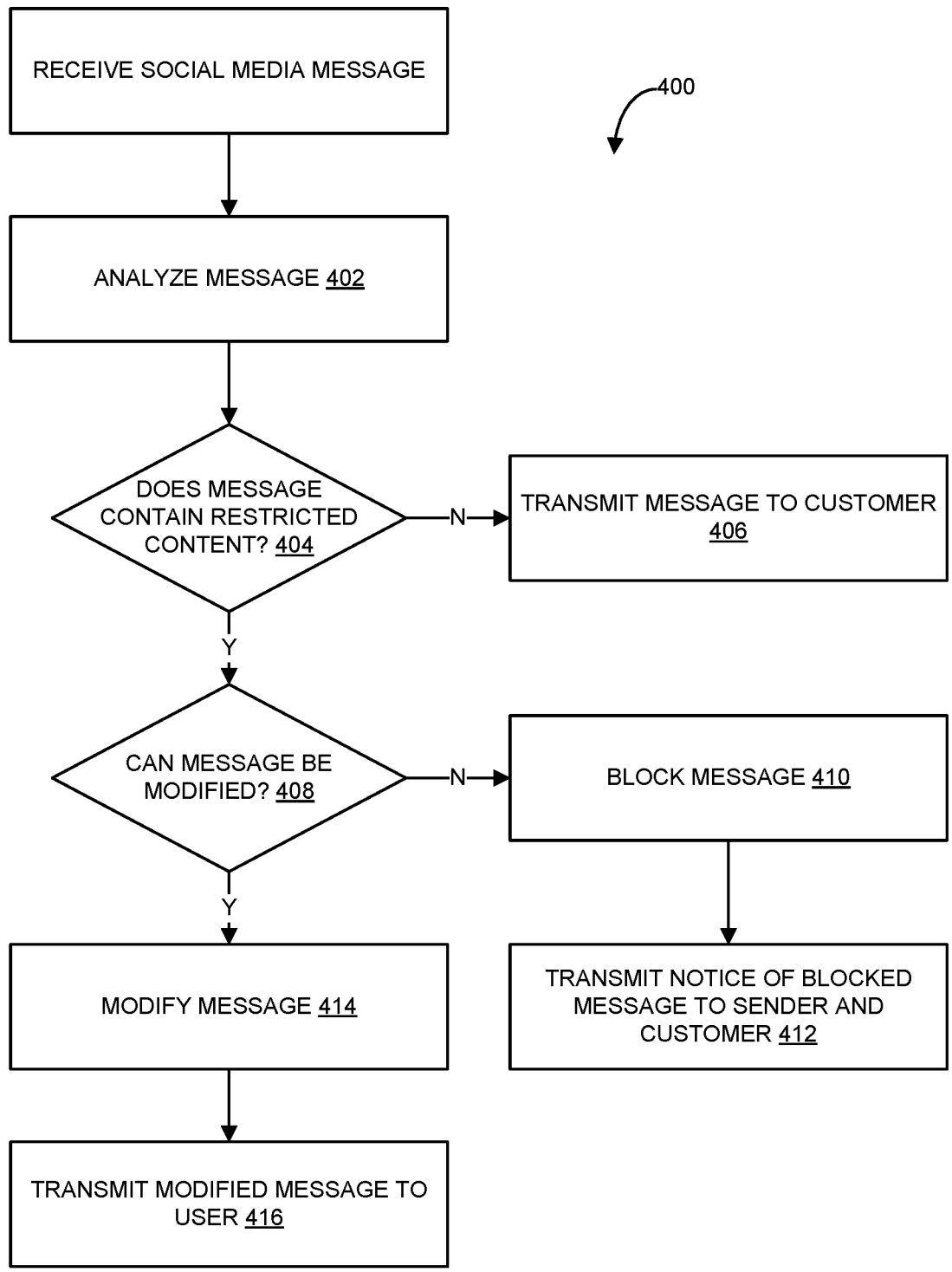
FIG. 4 is a flow diagram illustrating a process for modifying social media messages, according to an example embodiment.

Turning now to FIG. 4 a flow chart illustrating a process 400 for modifying a social media message is shown, according to some arrangements. In some arrangements, a social media message is a message directed to the customer 104 from another individual. However, in some arrangements, the social media message is understood to be an advertisement, such as a directed advertisement. The customer FI social media computing system 110 analyzes the message content at 402. In one arrangement, the message is analyzed similarly to the social media content described above in FIG. 3. For example, the message is analyzed to determine if the message contains restricted social media content. As described above, restricted social media content is content which could have a negative influence on one or more goals of the customer 104.

The customer FI social media computing system 110 determines if the message contains restricted content at 404. If the message does not contain restricted content, the message is transmitted to the customer 104 at 406. In some arrangements, the message may contain restricted content, but the customer FI social media computing system 110 may not have the required permissions to filter or modify the message, and will transmit the message to the customer 104 at 406. Additionally, the message may be associated with one or more exceptions as described above, and would therefore be transmitted to the customer 104 at 406.

If the customer FI social media computing system 110 determines that the message contains restricted social media content, the customer FI social media computing system 110 then determines if the message can be modified at 408. In one arrangement, the content modification circuit 136 may determine if the message can be modified. For example, if the message in total is related to restricted content, the content modification circuit 136 may not be able to modify the message without removing all original intent of the message. For example, if the message is "do you want to go to dinner," the content modification circuit 136 may not be able to modify the message without removing the intent. In other examples, the message is an advertisement. In some example, the content modification circuit 136 may determine that the message cannot be modified due to rules or permissions associated with the social media service. However, in other examples, the message may be able to be modified. For example, where the advertisement is for a new car, the advertisement may be able to be modified to show an advertisement for a savings plan, or a software application for money management.

If the message cannot be modified, the message is blocked at 410. A notice of the message being blocked is then provided to both the sender and the customer 104 at 412. The notice may inform both the sender and the customer 104 that the message was blocked. In some arrangements, the notice may inform the sender why the message was blocked. For example, the customer 104 may be able to set one or more automatic replies to senders of messages that are blocked to explain why the message was blocked. If the message can be modified, the message is modified at 414. As described above, the content modification circuit 136 may modify the message. In some arrangements, the customer FI social media computing system 110 may modify a message to remove or change the content of the message associated with negative influences. In some arrangements, an entire message may be modified, such as where an advertisement containing negative influence content is replaced with a different advertisement. Once the message has been modified, the modified message is transmitted to the customer 104 at 416. In some arrangements, the customer 104 is notified that the message has been modified.

Figure 5:
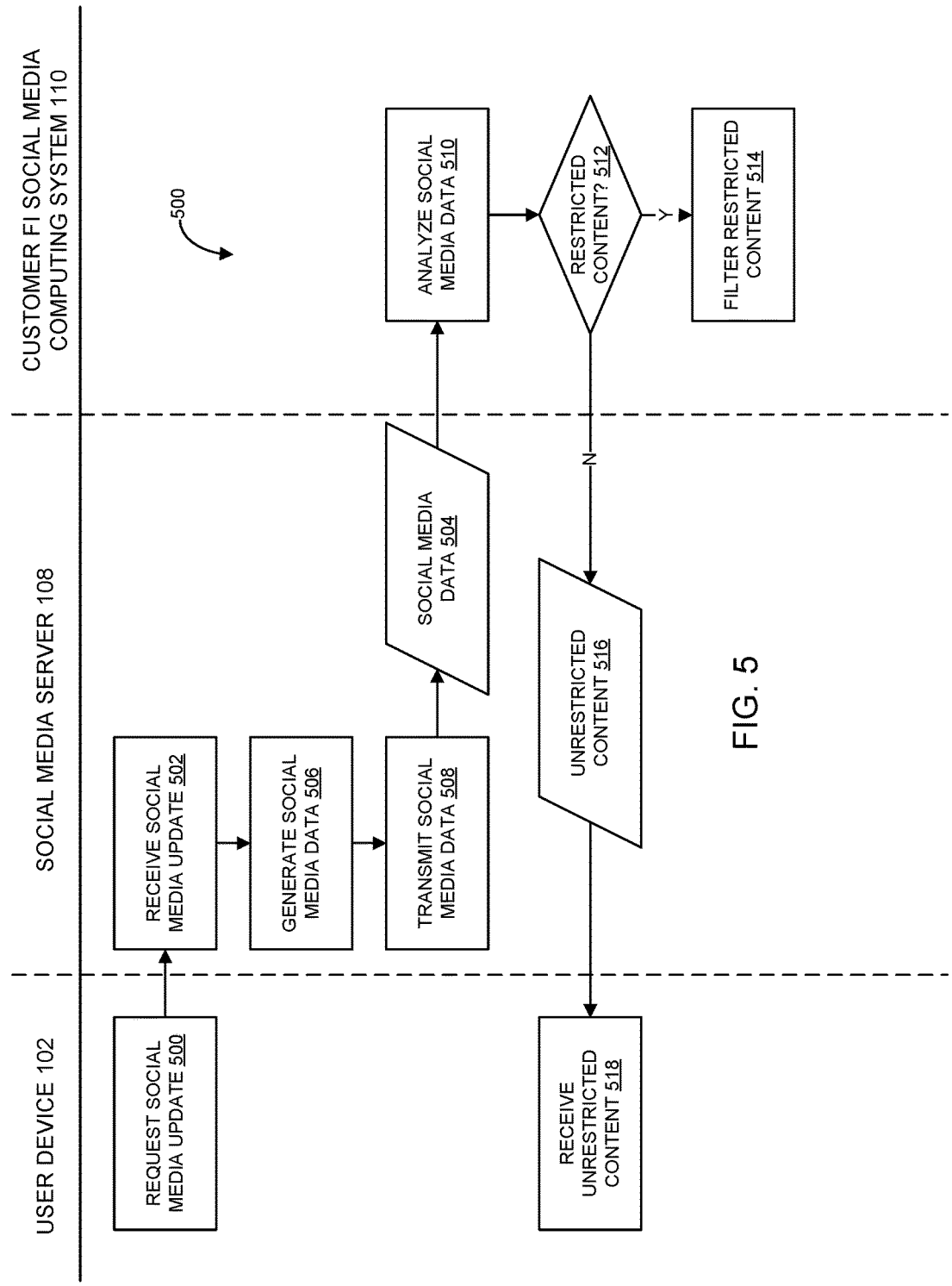
FIG. 5 is a flow diagram illustrating an example implementation of the method shown in FIG. 3.

FIG. 5 is a flow diagram illustrating an example implementation 500 of the method shown in FIG. 3. The customer 104 may request a social media update at 500 via their user device 102. In one arrangement, the customer 104 may request the social media updated via the social media app 122. The social media update may be a request to provide any new social media content available from one or more social media services. The social media server 108 receives the social media update at 502 and generates social media data 504 at 506. The social media data 504 may be all social media generated since a previous request for a social media update was presented by the customer 104. The social media data 504 is then transmitted to the customer FI social media computing system 110 at 508.

Upon receiving the social media data 504, the customer FI social media computing system 110 analyzes the social media data at 510. As described above, the customer FI social media computing system 110 may first extract social media content from the social media data 504. For example, the customer FI social media computing system 110 may utilize the AI circuit 130 to extract social media content from the social media data 504. The customer FI social media computing system 110 may then analyze the social media content by categorizing the social media content into restricted social media content and unrestricted social media content. Restricted social media content may include social media content which is determined to have a negative influence on one or more goals associated with the customer 104. In one arrangement, the customer FI social media computing system 110 may compare the extracted social media content against one or more references in determining whether the social media data should be unrestricted or restricted. The references may include various terms, phrases or other references relating to negative influences. In one arrangement, the references are stored in the dictionary 132.

The customer FI social media computing system 110 then determines if there is restricted social media content at 512. Restricted content is then filtered at 514. In some examples, restricted content may not be filtered where the customer FI social media computing system 110 does not have permission to filter certain content. For example, social media content associated with certain social media services may not be filtered based on permissions provided by the customer 104. In other examples, certain restricted content may be associated with one or more exceptions and will not be filtered, as described above. The unrestricted content 516 is then transmitted to the customer 104 via the user device 102, which receives the unrestricted content at 518. In some arrangements, the customer FI social media computing system 110 transmits the unrestricted content 516 directly to the user device 102. In some arrangements, the customer FI social media computing system 110 may instruct the social media server 108 to transmit the unrestricted content 516 to the social media server 108. The customer 104 may view the unrestricted content using the social media app 122. In other examples, the customer 104 may view the social media data via the FI app 120.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method for tailoring information delivered via a social media service, the method comprising:
   receiving a restriction permission identifying one or more social media services for which content is allowed to be modified from a user device associated with a user;
   receiving social media data of the user from a social media service of the one or more social media services at a social media computing system associated with a financial institution ("FI");
   analyzing the received social media data, wherein analyzing the received social media data comprises:
      determining if content within the received social media data should be categorized based on the restriction permission;
      categorizing the content within the received social media data as at least one of restricted content elements and unrestricted content elements in response to the determination the content should be categorized, the restricted content elements and the unrestricted content elements determined based on one or more predetermined parameters associated with one or more goals of the user, at least one of the one or more goals of the user being a financial goal; and
      determining, in response to the content being categorized as restricted content elements, that the restricted content elements can be modified by determining that the social media service is one of the one or more social media services identified by the restriction permission;
   modifying, in response to the determination that the restricted content elements can be modified, at least a portion of the restricted content elements; and
   transmitting the unrestricted content elements, the modified restricted content elements, and a notification that the modified restricted content elements have been modified to the user device associated with the user without transmitting unmodified restricted content elements.

2. The method of claim 1, further comprising:
   determining that one or more of the restricted content elements are associated with one or more exceptions.

3. The method of claim 2, further comprising transmitting the restricted content elements associated with one or more exceptions to the user device.

4. The method of claim 1, wherein categorizing the content further comprises:
   comparing the content within the received social media data against one or more references in a dictionary, the one or more references associated with one or more negative influences specified by a user setting; and
   determining that content within the received social media data is a restricted content element based on the comparison of the content to the one or more references.

5. The method of claim 4, wherein the one or more references comprise one or more of words, phrases, images, and geographic locations associated with the one or more negative influences.

6. The method of claim 1, further comprising:
   receiving an indication from the user device indicating that one or more of the unrestricted content elements should be classified as restricted content elements; and
   updating a dictionary with one or more terms or images associated with the one or more indicated unrestricted content elements that should be classified as restricted content elements.

7. The method of claim 1, wherein the content is a directed advertisement.

8. The method of claim 7, further comprising modifying the directed advertisement to substitute any restricted content elements with modified unrestricted content elements, and transmitting the modified unrestricted content elements to the user device.

9. The method of claim 1, further comprising extracting the content using an artificial intelligence algorithm.

10. The method of claim 1, wherein the one or more goals comprise one or more of a physical fitness goal and a weight loss goal.

11. A system for filtering social media data, the system comprising:
    a customer financial institution ("FI") social media computing system associated with a financial institution and configured to:
       receive social media data of a user from a social media server;
       receive a restriction permission;
       analyze the received social media data, wherein analyzing the received social media data comprises:
          determining if content within the received social media data should be categorized based on the restriction permission;

categorizing the content within the received social media data as at least one of restricted content elements and unrestricted content elements in response to the determination the content should be categorized, the restricted content elements and the unrestricted content elements determined based on one or more predetermined parameters associated with a financial goal of the user, and wherein categorizing the content as restricted content elements is based on the content having a potential to induce the user to make a purchase inconsistent with achieving the financial goal of the user; and determining, in response to the content being categorized as restricted content elements, that the restricted content elements can be modified;

modify, in response to the determination that the restricted content elements can be modified, at least a portion of the restricted content elements; and transmit the unrestricted content elements, the modified restricted content elements, and a notification that the modified restricted content elements have been modified to a user device associated with the user without transmitting unmodified restricted content elements.

12. The system of claim 11, wherein the customer FI social media computing system is further configured to determine that one or more of the restricted content elements are associated with one or more exceptions.

13. The system of claim 12, wherein the customer FI social media computing system is further configured to transmit the restricted content elements associated with one or more exceptions to the user device.

14. The system of claim 11, wherein the customer FI social media computing system is further configured to categorize the content by:

comparing the content within the received social media data against one or more references in a dictionary, the one or more references associated with one or more negative influences specified by a user setting; and determining that content within the received social media data is a restricted content element based on the comparison of the content to the one or more references.

15. The system of claim 14, wherein the one or more references comprise one or more of words, phrases, images, and geographic locations associated with the one or more negative influences.

16. The system of claim 14, wherein the customer FI social media computing system is further configured to:

receive an indication from the user device indicating that one or more of the unrestricted content elements should be classified as restricted content elements; and update the dictionary with one or more terms or images associated with the one or more indicated unrestricted content elements that should be classified as restricted content elements.

17. The system of claim 11, wherein the content is a directed advertisement.

18. The system of claim 17, wherein the customer FI social media computing system is further configured to modify the directed advertisement by substituting any restricted content elements with modified unrestricted content elements, and transmitting the modified unrestricted content elements to the user device.

* * * * *